(12) United States Patent
Casparian et al.

(10) Patent No.: US 9,272,215 B2
(45) Date of Patent: Mar. 1, 2016

(54) GAMING KEYBOARD WITH POWER CONNECTION SYSTEM AND RELATED METHODS

(71) Applicants: Mark A. Casparian, Miami, FL (US);
Gabriel Gonzalez, Miami, FL (US);
Frank C. Azor, Palmetto Bay, FL (US);
Reginald I. Rego, Miami, FL (US);
David Estrada, Miami, FL (US);
Jacqueline F. Gutierrez, The Woodlands, TX (US)

(72) Inventors: Mark A. Casparian, Miami, FL (US);
Gabriel Gonzalez, Miami, FL (US);
Frank C. Azor, Palmetto Bay, FL (US);
Reginald I. Rego, Miami, FL (US);
David Estrada, Miami, FL (US);
Jacqueline F. Gutierrez, The Woodlands, TX (US)

(73) Assignee: Dell Products LP, Round Rock, TX (US)

( * ) Notice: Subject to any disclaimer, the term of this patent is extended or adjusted under 35 U.S.C. 154(b) by 389 days.

(21) Appl. No.: 13/784,012

(22) Filed: Mar. 4, 2013

(65) Prior Publication Data

US 2013/0178291 A1 Jul. 11, 2013

Related U.S. Application Data

(62) Division of application No. 11/810,194, filed on Jun. 5, 2007, now Pat. No. 8,411,029.

(51) Int. Cl.
*G06F 17/30* (2006.01)
*A63F 13/20* (2014.01)
*G06F 1/26* (2006.01)
*G06F 1/16* (2006.01)
*G06F 3/02* (2006.01)
(Continued)

(52) U.S. Cl.
CPC .............. *A63F 13/20* (2014.09); *G06F 1/1688* (2013.01); *G06F 1/26* (2013.01); *G06F 3/0202* (2013.01); *G06F 3/0219* (2013.01); *G06F 3/0238* (2013.01); *G06F 17/30002* (2013.01); *H01H 13/83* (2013.01); *A63F 13/06* (2013.01); *A63F 2009/2404* (2013.01)

(58) Field of Classification Search
CPC ....... G06F 1/1669; G06F 1/26; G06F 1/1688; G06F 3/0238; G06F 17/30002; G06F 3/0219; G06F 3/0202; G06F 3/14; G06F 3/0227; A63F 13/06; A63F 13/10; A63F 2300/6045
See application file for complete search history.

(56) References Cited

U.S. PATENT DOCUMENTS 4,279,021 A 7/1981 See et al.
4,302,011 A 11/1981 Pepper, Jr.
(Continued)

FOREIGN PATENT DOCUMENTS

WO 97/27529 7/1997 .............. G06F 3/023

*Primary Examiner* — Justin Myhr
(74) *Attorney, Agent, or Firm* — Egan, Peterman, Enders & Huston LLP.

(57) ABSTRACT

A gaming keyboard and related methods are disclosed that provide features to enhance the computer gaming experience. A keyboard connection pod is disclosed that improves power capabilities of the keyboard thereby allowing for enhanced features that require more power. A panic mechanism is disclosed that can be triggered to cause one or more selected keys to change states. Keycap rim-lighting is disclosed that provides improved visual indication of key positions. A hand registration enhancement is disclosed including a spacebar having a thumb notch and/or WASD and spacebar keys with different tactile response than other keys. Function keys are disclosed that are positioned proximate to allow reduced movement of the left hand. An integrated cord wrap tray is disclosed for a peripheral such as a mouse. Other features and variations are also disclosed.

20 Claims, 9 Drawing Sheets

(51) Int. Cl.
 *G06F 3/023* (2006.01)
 *H01H 13/83* (2006.01)
 *A63F 9/24* (2006.01)

(56) References Cited

U.S. PATENT DOCUMENTS

| | | | |
|---|---|---|---|
| 4,527,250 A | 7/1985 | Galdun et al. | |
| 4,698,618 A | 10/1987 | Liuzzo et al. | |
| 5,410,305 A * | 4/1995 | Barrus et al. | 341/22 |
| D362,432 S | 9/1995 | Paull et al. | |
| 5,450,078 A | 9/1995 | Silva et al. | |
| D381,016 S | 7/1997 | Paull et al. | |
| 5,767,463 A | 6/1998 | Gandre | |
| 5,775,939 A * | 7/1998 | Brown | 439/502 |
| 5,909,211 A | 6/1999 | Combs et al. | |
| 6,007,372 A * | 12/1999 | Wood | 439/502 |
| 6,171,187 B1 | 1/2001 | Audebert et al. | |
| 6,357,940 B1 | 3/2002 | Murphy | |
| 6,608,271 B2 | 8/2003 | Duarte | |
| 6,717,569 B1 | 4/2004 | Gruhl et al. | |
| 6,746,273 B1 * | 6/2004 | Liu et al. | 439/502 |
| 6,786,823 B2 | 9/2004 | Huang et al. | |
| 6,827,513 B2 | 12/2004 | Huang | |
| 6,847,352 B2 | 1/2005 | Lantigua | |
| 6,918,677 B2 | 7/2005 | Shipman | |
| 7,382,357 B2 | 6/2008 | Panotopoulos et al. | |
| 7,953,448 B2 | 5/2011 | Pletikosa et al. | |
| 8,162,552 B2 | 4/2012 | Rak et al. | |
| 8,212,770 B2 | 7/2012 | Obourn et al. | |
| 8,224,391 B2 | 7/2012 | Kim et al. | |
| 2003/0072595 A1 | 4/2003 | Al-Safar | |
| 2003/0095288 A1 * | 5/2003 | Hung et al. | 358/296 |
| 2003/0132915 A1 | 7/2003 | Mitchell | |
| 2003/0188049 A1 * | 10/2003 | Dickens | 710/8 |
| 2003/0202337 A1 | 10/2003 | Yin et al. | |
| 2004/0106451 A1 | 6/2004 | Huang et al. | |
| 2004/0140998 A1 | 7/2004 | Gravina et al. | |
| 2004/0159779 A1 * | 8/2004 | Duff | 250/221 |
| 2004/0183783 A1 | 9/2004 | Rojas et al. | |
| 2005/0073446 A1 | 4/2005 | Lazaridis et al. | |
| 2006/0002951 A1 | 1/2006 | Kleiman et al. | |
| 2006/0007159 A1 | 1/2006 | Lane et al. | |
| 2006/0011461 A1 | 1/2006 | Chan et al. | |
| 2006/0022951 A1 | 2/2006 | Hull | |
| 2006/0148564 A1 | 7/2006 | Herkelman | |
| 2006/0238510 A1 | 10/2006 | Panotopoulos et al. | |
| 2007/0132733 A1 * | 6/2007 | Ram | 345/163 |
| 2007/0281747 A1 | 12/2007 | Pletikosa et al. | |
| 2007/0285393 A1 | 12/2007 | Ishakov | |
| 2008/0303698 A1 | 12/2008 | Casparian et al. | |
| 2009/0054146 A1 | 2/2009 | Epstein et al. | |
| 2010/0066572 A1 | 3/2010 | Dietz et al. | |
| 2013/0178292 A1 | 7/2013 | Casparian et al. | |

* cited by examiner

GAMING KEYBOARD WITH POWER CONNECTION SYSTEM AND RELATED METHODS

RELATED APPLICATIONS

This application is a divisional application of the following co-pending application: U.S. patent application Ser. No. 11/810,194, filed Jun. 5, 2007, and entitled "GAMING KEYBOARD AND RELATED METHODS," which is hereby incorporated by reference in its entirety.

TECHNICAL FIELD OF THE INVENTION

This invention relates to keyboards for information handling systems and, more particularly, keyboards for such systems used for playing games.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are used for computer gaming. This computer gaming takes the form of single person gaming and multi-person gaming, for example, through an Internet connection. Computer games come in a variety of genres including first-person shooter (FPS) games and real time strategy (RTS) games. In addition, these games can be played through multi-person online gaming connections, and some games are deemed massively multiplayer online (MMO) games because of the large numbers of people that simultaneously play the games. For some computer games, such as FPS games, the speed of the computer system being used for gaming is important to the experience and performance of the gamer within the game. Gaming computers and peripherals, such as mice and keyboards, have been designed with this game performance in mind. However, gamers are always desiring new computer systems and peripherals that provide them the speed, ergonomics, or other features that will enhance their competitive ability and gaming experience. In short, many computer gamers never stop looking for a feature that will provide them a competitive advantage.

SUMMARY OF THE INVENTION

A gaming keyboard and related methods are disclosed that provide features to enhance the computer gaming experience. One feature disclosed herein is a keyboard connection pod that improves power capabilities of the keyboard thereby allowing for enhanced features that require more power to be delivered to the keyboard than can be provided through common keyboard connections to host computer systems. Another feature disclosed herein is a panic mechanism that can be triggered by a computer gamer to cause one or more selected keys to change states such that the gamer can more easily re-register the gamer's hand or hands on the keyboard. A further feature is keycap rim-lighting that provides easier visual indication of key positions to a gamer. A still further feature is a hand registration enhancement including a spacebar having a thumb notch, as well as WASD and spacebar keys with different tactile response than other keys. In addition, function keys can be positioned proximate the left pinky finger and left thumb for ease of use without requiring movement of the left hand. Further, an integrated cord wrap tray is provided for a peripheral such as a mouse. As described below, other features and variations can be implemented, if desired, and a related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE DRAWINGS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

A gaming keyboard and related methods are disclosed that provide features to enhance the computer gaming experience. In part, a keyboard connection pod is described that efficiently enhances power to the keyboard. In part, the techniques described herein provide systems and methods for distinguishing certain keys on a keyboard for use with a game device, such as illuminating key rims and allowing a user to quickly distinguish certain keys by prompting a sensor, for example, a sensor in a palm rest, to change the state of certain keys, such as the W, A, S, and D keys (abbreviated herein as WASD keys), causing the keys activated to change temperature, illuminate, change color, vibrate or change state in some way so that a user can more easily register or re-register the user's hands on the keyboard. In part, the techniques described herein provide a hand registration enhancement including a spacebar having a thumb notch and WASD keys with different tactile response than other keys. In part, the techniques described here allow for convenient and efficient storage of peripheral cords such as a mouse cord. Other features and variations can also be implemented, if desired.

Figure 1:
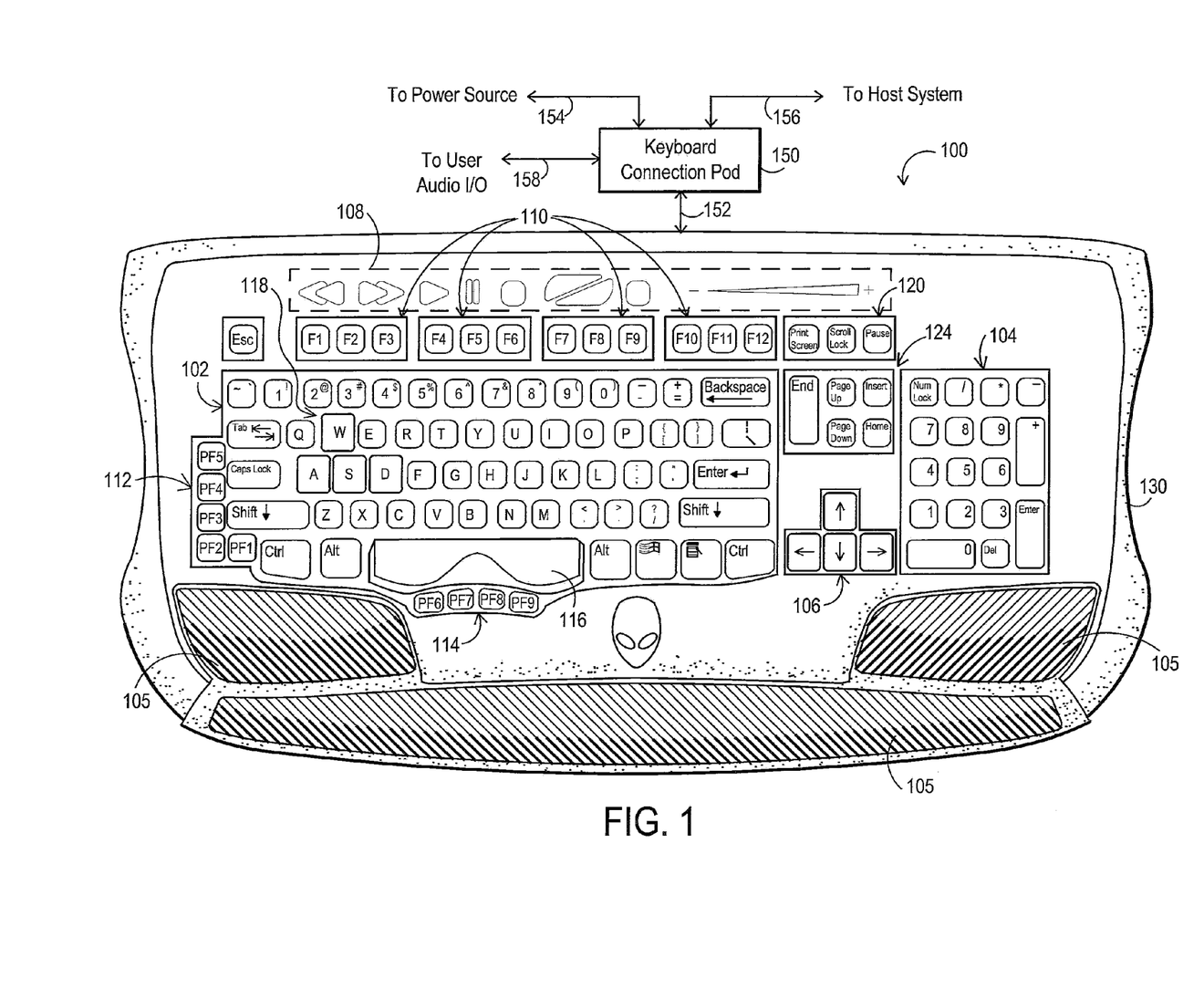
FIG. 1 is a diagram of a gaming keyboard having one or more advantageous gaming enhancement features as described herein.

FIG. 1 is a diagram of a keyboard 100 that can be used for gaming with a game device such as an information handling system configured with gaming software and a display. Looking to FIG. 1, as is common with many keyboards, the keyboard 100 can include an alphanumeric key section 102, a numeric pad section 104, an inverted-T direction arrow keys section 106, a navigation and editing keys section 124, a print screen/scroll lock/pause key section 120, and sets of function keys 110. As primarily discussed herein, it is assumed that the information handling system is a desktop or laptop personal computer system; however, other gaming systems could use the keyboard features described herein, as desired.

As described in more detail below, one or more of the following unique and advantageous features may also be included with respect to the keyboard 100. The keyboard 100 can be connected to a keyboard connection pod 150 through connection 152, and this keyboard connection pod 150 can in turn provide connections for the keyboard 100 to a host system through connection 156, a power source through connection 154, and user audio input/output (I/O) through connection 158. The keyboard 100 can also include a touch activated key section 108, for example, keys that are capacitively activated through touch. As further described below, the keyboard 100 can also include a unique hand registration feature of having a spacebar 116 with a thumb notch and having the spacebar 116 and the WASD keys 114 be of a different material and/or look than the other surrounding keys. Further, as described below, the keyboard can have function keys 114 uniquely located below the spacebar and/or slanted function keys 112 uniquely located adjacent the left side of the alphanumeric key section 102. Although not shown in this perspective, the keyboard 100 can also include a retractable peripheral cord wrap tray, for example, located in the side of the keyboard at location 130. The keyboard 100 may also have a palm rest 105. A panic sensor and trigger mechanism can be provided in this palm rest 105 or can associated in some other way with the keyboard 100. When triggered, one or more keys will change state to allow a user to more rapidly register or re-register the user's hands with respect to the keys of the keyboard. These different features are now discussed in more detail.

Keyboard Connection Pod

The keyboard 100 may include a keyboard connection pod 150 that improves the amount of power delivered to the keyboard 100 and the efficiency of this power delivery. As indicated above with respect to FIG. 1, the keyboard 100 can be connected to a keyboard connection pod 150 through connection 152, and this power connection pod 150 can in turn provide connections for the keyboard 100 to a host system through connection 156, a power source through connection 154, and user audio input/output (I/O) through connection 158. This keyboard connection pod feature is now described in more detail through FIGS. 2A, 2B and 2C.

Figure 2A:
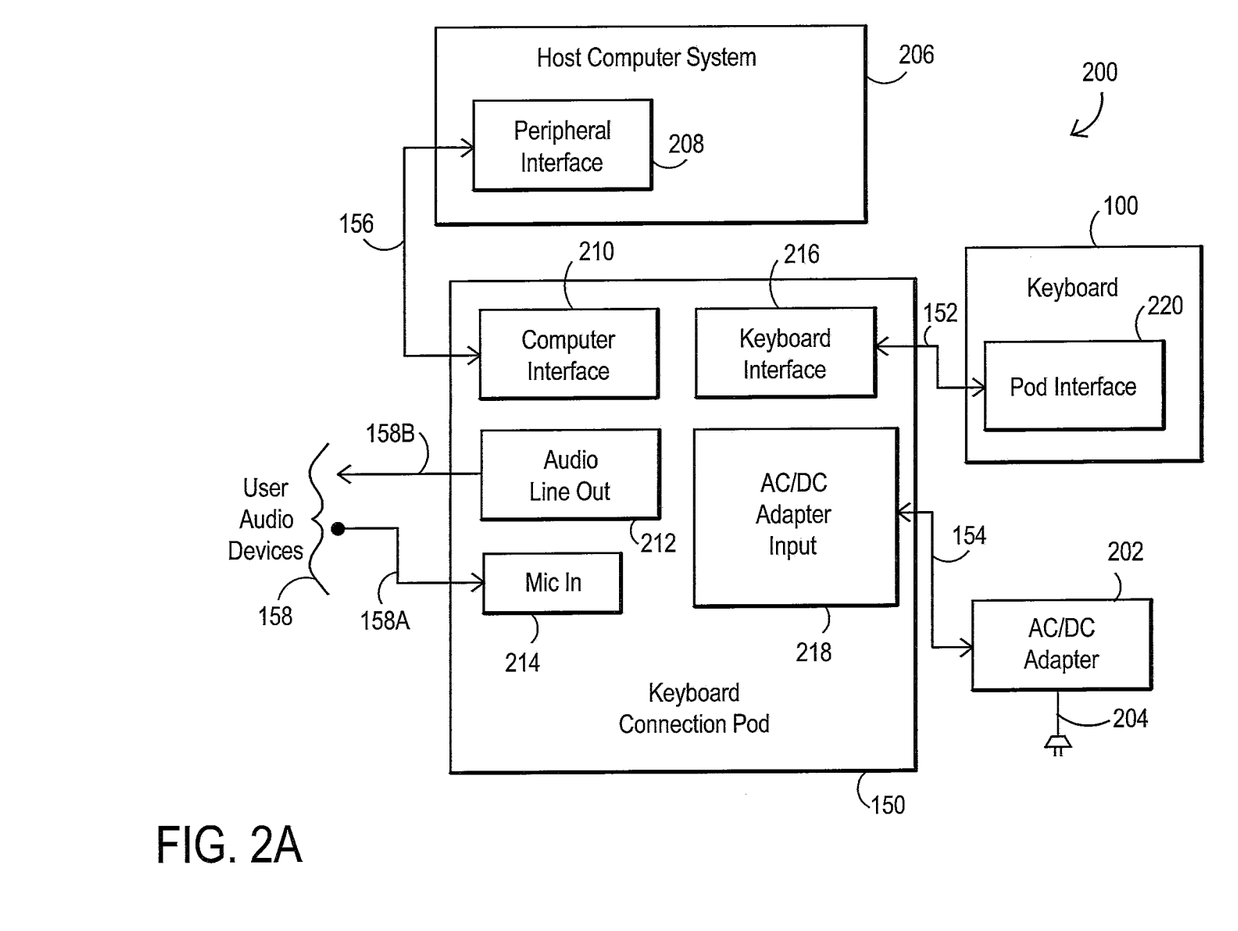
FIG. 2A is a block diagram for a keyboard connection pod system.

FIG. 2A is a block diagram for a keyboard connection pod system 150 in environment 200. As depicted, the keyboard connection pod 150 includes an audio input block for a microphone (MIC IN) 214, an audio output block for a line out (LINE OUT) 212, an AC/DC adapter input block 218, a computer interface 210 and a keyboard interface 216. The audio LINE OUT connection 158B and the audio MIC IN connection 158A make up connections to user audio devices 158, for example, a microphone and a headset that could be used for gaming. A host computer system 206 includes a peripheral interface 208, such as a USB interface, that communicates with the computer interface 210 through connection 156. Keyboard 100 includes a pod interface 220 that communicates with the keyboard interface 216 through connection 152. AC/DC adapter 202 connects to AC/DC adapter input block 218 through connection 154 and connects to a power source, such as a wall socket, through connector 204. It is noted that connection 152, 154, 156, 158A and 158B may include individual connection lines or groups of connections lines, as desired, depending upon the signals and/or capabilities desired to be provided through these connections.

Figure 2B:
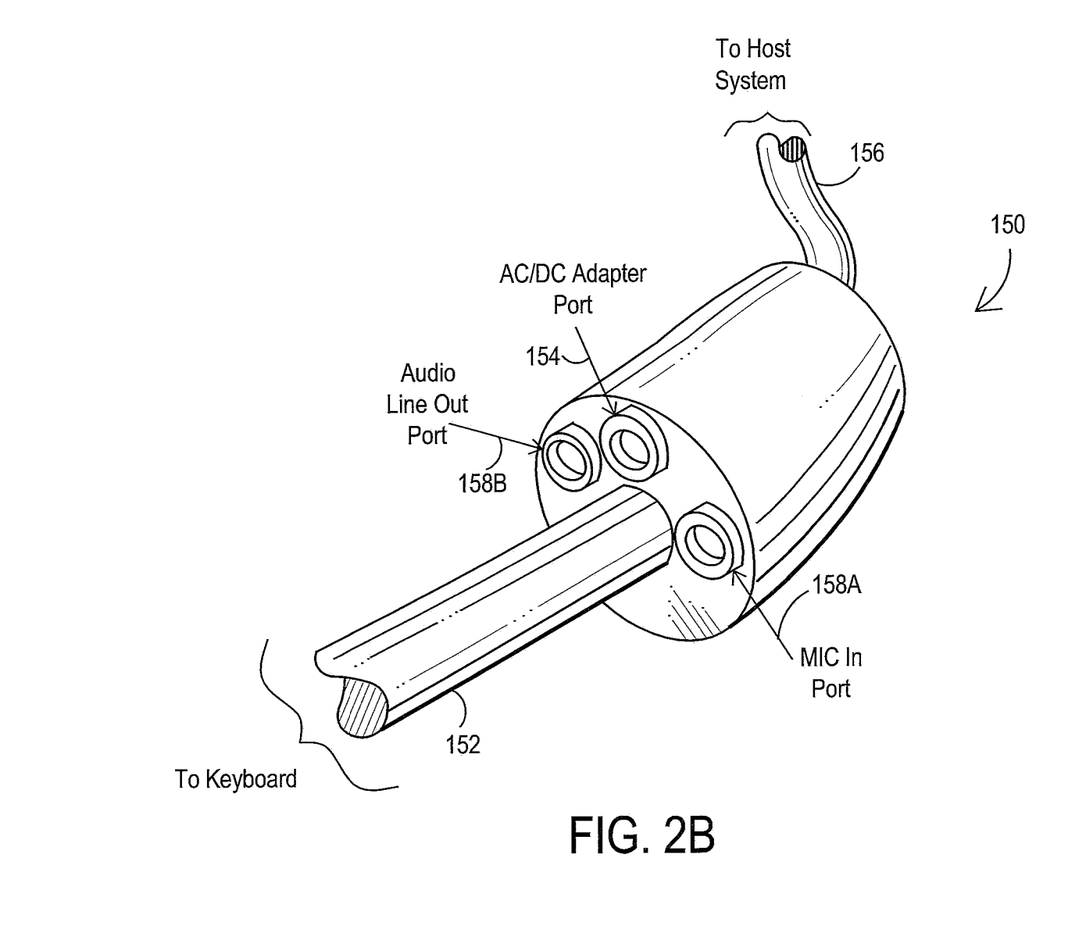
FIG. 2B is a diagram for an example keyboard connection pod.

FIG. 2B is a diagram for an example keyboard connection pod 150. As depicted, the housing for the keyboard connection pod 150 is cylindrical in shape. A connection 156 in the form of a cable connects to a host system. A connection 152 in the form of a cable connects to the keyboard. For the embodiment depicted, an audio LINE OUT port 158B, an audio MIC IN port 158A, and an AC/DC adapter port 154 are positioned adjacent the end of the keyboard connection pod 150 next to the cable connection 152 to the keyboard.

Figure 2C:
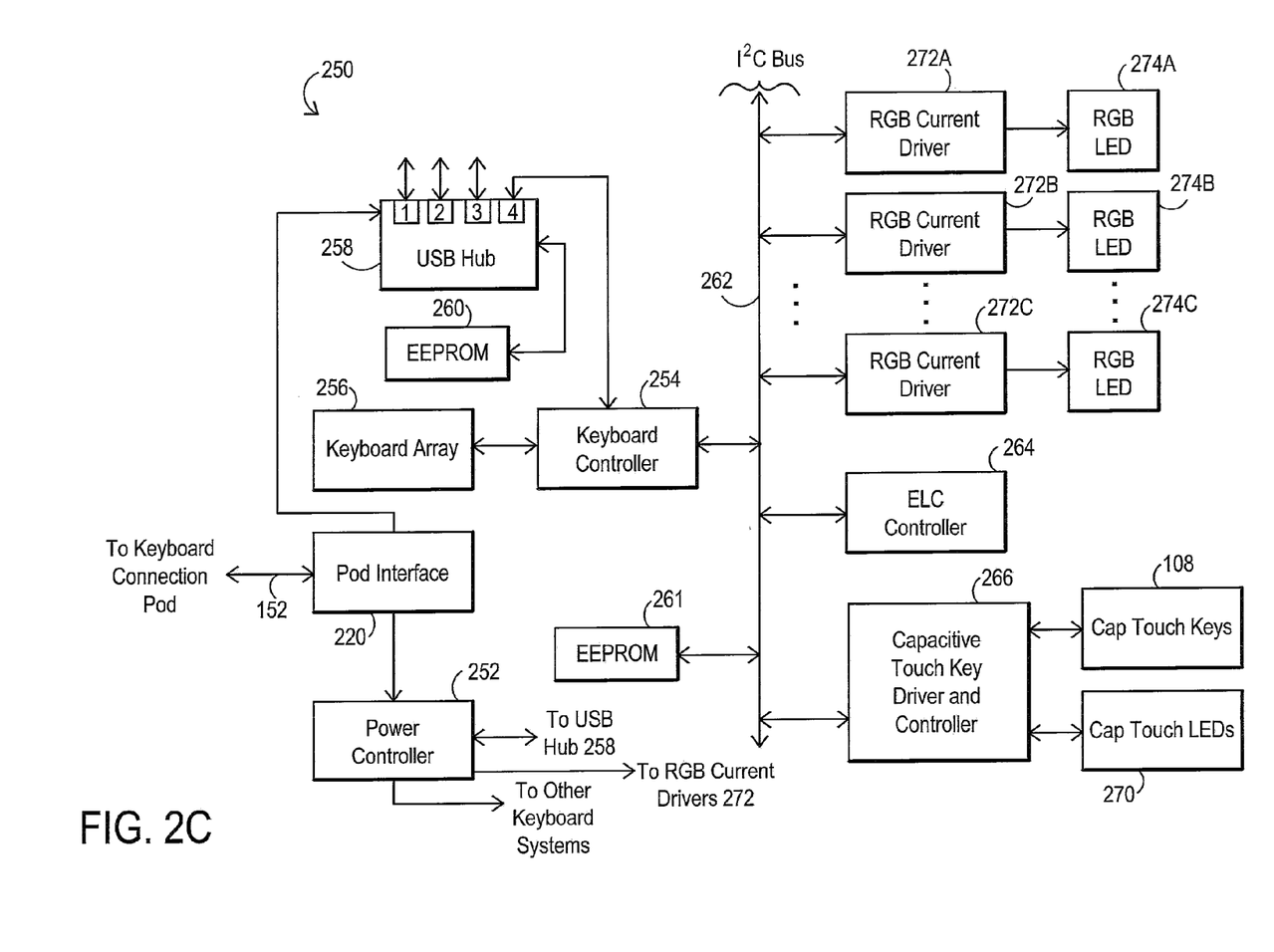
FIG. 2C is a block diagram for circuitry within a keyboard including a pod interface connected to a keyboard connection pod.

FIG. 2C is a block diagram for circuitry 250 within a keyboard including a pod interface 220 connected to a keyboard connection pod through connection 152. The pod interface 220 receives both power and data signals through the connection 152. Data signals are communicated to and from the USB Hub 258. Power is provided to power controller 252. The power controller 252 then distributes power to USB hub 258, the red, green, blue (abbreviated herein as RGB) current drivers 272, and other keyboard systems. The keyboard controller 254 communicates and controls the keyboard array 256 including, for example, the keys and key section depicted in FIG. 1. The keyboard controller 254 also communicates with USB hub 258 through which additional peripherals can be connected to the keyboard, such as a mouse. The USB hub 258, as depicted, includes four ports (1, 2, 3, 4) and port 4 is connected to the keyboard controller. In addition, a EEPROM 260 can be connected to the USB hub 258 providing identification data to the USB hub 258.

The keyboard controller 254 can also be coupled to an internal communication bus, such as an I2C bus 262. The keyboard controller 254 can communicate with a variety of other keyboard systems using this I2C bus. For example, capacitive touch key driver and controller 266 is coupled to the I2C bus 262. Capacitive touch keys 108 and capacitive touch LEDs 270 are connected to and controlled by the capacitive touch key driver and controller 266. An electronic light control (ELC) controller 264, which can have programmable operation, is also coupled to the I2C bus 262. The ELC controller 264 helps control a series of RGB current drivers 272A, 272B . . . 272C that in turn control RGB LEDs 274A, 274B . . . 274C, respectively. Twelve or more RGB LEDs can be used. In addition, a EEPROM 261 can be coupled to I2C bus 262 to provide identification data to the keyboard controller 254 and/or store user programmable parameters, as desired, for the ELC controller 264.

Advantageously, the keyboard connection pod 150 provides significant additional power to run keyboard systems while appearing to have only one cable attached to the keyboard on the user's desktop surface. From the keyboard, a person sees a single cable that can be approximately one meter long. At the end of the cable is the keyboard connection pod 150. The location of this section can be configured to be well behind the user's desk and normally out of sight. Here, the user plugs in the AC/DC power adapter 202, and this power connection can then routed up to the keyboard inside the keyboard cable assembly 152. The user audio device connections 158A and 158B can also be included with the keyboard connection pod 150, as discussed above, and these audio connections can also be routed up to the keyboard inside the keyboard cable assembly 152.

It is also noted that the additional power provided by the keyboard connection pod 150 and the AC/DC adapter 202 can allow for the keyboard 100 to include high speed USB 2.0 ports. For example, the USB hub and controller 258 can be a USB 2.0 High Speed (HS) controller and two or more of the ports for the USB hub 258 can be USB 2.0 HS ports. This implementation requires a USB HS controller chip which, with today's technology, has higher power requirements than can be met by current USB keyboards whose internal circuitry is USB bus-powered. In other words, the power available through a standard USB connection from a host system to a keyboard with current technology is not enough to allow for operation of the USB 2.0 HS controller and is only enough to allow for use of a reduced number of LED drivers and associated LEDs.

As discussed, therefore, keyboard 100 has a number of subsystems that together require additional power to the keyboard 100 in excess of what can currently be provided through a standard USB connection. And this additional power is provided through the AC/DC power adapter 202 connected to the keyboard connection pod 150. However, if a user chooses not to connect the AC/DC power adapter 202 or if the AC/DC power adapter 202 becomes unconnected for some reason, the keyboard 100 can be configured to drop into a low power mode. In this low power mode, certain functionality would be reduced so that the power requirements could be met by the standard USB connection to the host system.

Illumination of Key Rims

As discussed above, the keyboard 100 addresses various gaming features to enhance the gaming experience for gamers playing a variety of games. One environmental gaming factor is the fact that many gamers desire the ability to use a keyboard 100 in a dimly lit or dark room so as to enhance a gamer's ability to view and focus on the gaming system display during game play. Ambient light and glare from ambient light can often interfere with a gamer's ability to see game detail on the display screen. One disadvantage of a dimly lit or dark room, however, is the inability to see the keyboard and, more particularly, the keys on the keyboard and the key designation. To alleviate this problem, key characters have been illuminated or backlit through the use of LEDs. In addition, key characters have been illuminated using RGB (Red, Blue, Green) LEDs that allow for the selection of color for the keys and color groupings for keys related to different gaming functions.

Figure 3A:
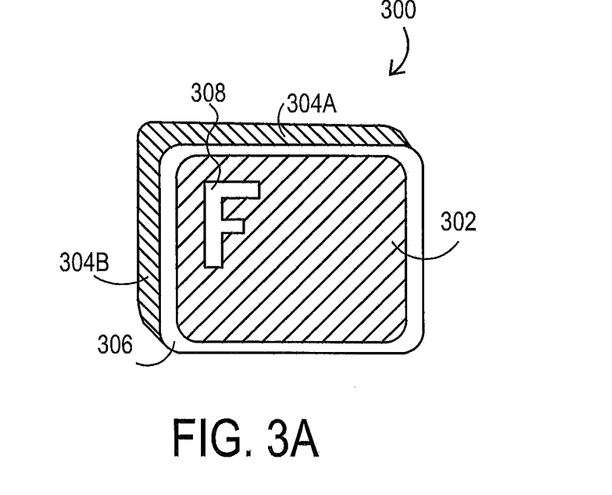
FIG. 3A is a block diagram for an example keyboard key having rim lighting.

FIG. 3A is a block diagram for an example keyboard key 300 having rim lighting that provides a significant improvement over prior illumination solutions. An "F" key is depicted. As depicted, the top surface 302 and the sides, such as sides 304A and 304B, of the key 300 are opaque. The letter indicia 308 is translucent, as has been done in prior solutions. However, as depicted and described herein, the rim 306 of the key 300 is also translucent. When the key 300 is illuminated by a light source underneath the key, as with an LED light source, the rim 306 as well as the letter indicia 308 will be illuminated. This rim lighting allows for significant improvement in the ability to see the key so that proper placement of the fingers can occur. This proper placement is particularly helpful, for example, if a gamer removes his/her hands from the keyboard and needs to re-register his/her hands on the proper gaming keys. The key rim 306 may also be raised from the top surface 302 to further help tactically distinguish the edge of the key 300.

It is noted that the key 300 can be manufactured by coating a translucent plastic with an opaque material and then laser etching the rim 306 and/or the letter indicia 308 to make the desired portions to be illuminated. It is also noted that an AC/DC adapter, battery, or other supplemental form of power can be used to facilitate the lighting of the keys on the keyboard. If all keys are to be lit, for example, with RGB LEDs, the power required will not be supported by power from a current USB connection, which is the common connection technique for keyboards. The keyboard connection pod described above with respect to FIGS. 2A, 2B and 2C provides one implementation for providing this additional power to the keyboard. Alternatively, RGB LEDs could be incorporated while ensuring the power is limited to the limit posed by the USB specifications, which would support up to about 11 RGB LEDs considering the USB 2.0 specifications.

It is noted that rather than have different colors, single color LEDs can be used to backlight the keys of the keyboard 100. In addition, an LCD panel can be used for finer granularity in particular areas that are to be backlit with a single color backlit scheme. The transmissive LCD performs as a light shutter, with each LCD segment allowing for the ability to allow or prevent the passage of light to the key device's housing via the single LED. Each LCD segment thereby acts like a camera shutter on the keyboard 100. Other lighting configurations could also be utilized, as desired, while still taking advantage of the rim lighting described herein.

Figure 3B:
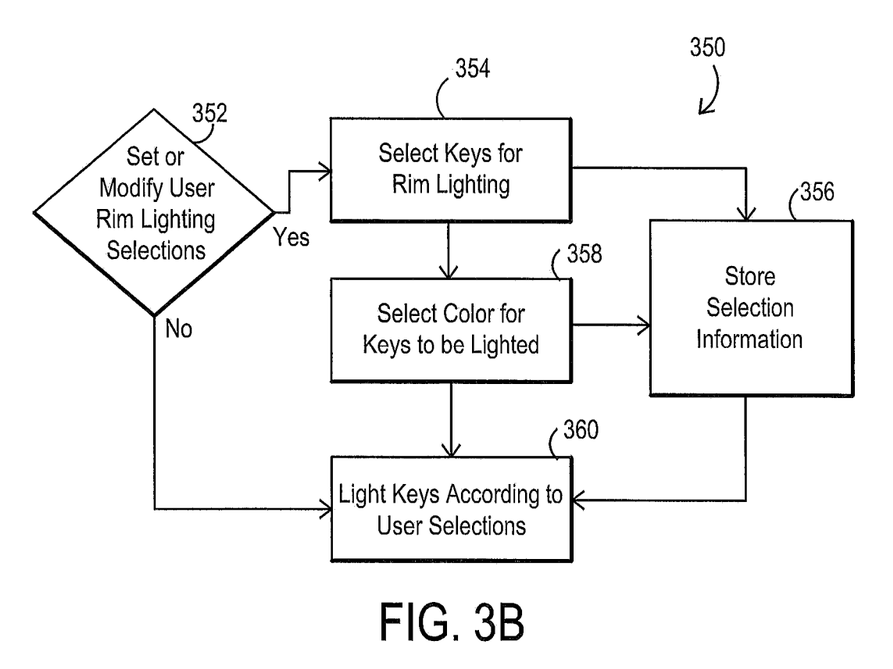
FIG. 3B is a process flow drawing for user selectable rim lighting.

FIG. 3B is a process flow drawing for user selectable rim lighting process 350. The key and rim lighting discussed above is preferably user programmable such that which keys are lit and/or what color they are lit with may be user selected. For example, a gamer may desire to have all movement related keys be lit in blue, all weapon related keys to be lit in red, and allow information related keys be lit in yellow. Looking to FIG. 3B as depicted, it is seen that process 350 starts with decision block 352 where a decision is made whether a user desires to set or modify user rim lighting selections. If "YES," the flow passes to block 354 where a user can programmably select keys for rim lighting, and then to block 358 where a user can programmably select the lighting color for the keys to be lighted. The user selection information from blocks 354 and 358 are also stored in block 356. Flow then passes to block 360 where the keys are lighted according to the stored user selections. If the decision is "NO" in block 352, then flow passes directly to block 360 where existing stored settings are used to light the keys.

Hand Registration and Re-Registration Including Thumb-Notch

As discussed above, the keyboard 100 addresses various gaming features to enhance the gaming experience for gamers playing a variety of games. As indicated above, hand registration and re-registration features, including a thumb notch in the spacebar can be included in the gaming keyboard 100 to meet the needs of gamers. For example, first person shooter (FPS) gamers whose games require fast finger speed and reaction time, often desire to be able to blindly find correct keys quickly and/or blindly self-navigate their fingers to a correct position on the keyboard 100 without ever having to take their eyes off the gaming system display. An FPS gamer risks experiencing an unfavorable lethal gaming situation if the FPS gamer takes his eyes off the display, even for a split second. In addition, because of the fast finger speed required for FPS games, an FPS gamer's fingers can fall off certain keys when experiencing high action or chaos during play.

For example, the WASD keys 118 and spacebar 116 key are often important gaming direction and action keys used in many computer games including most FPS games. As such, it is desirable for a gamer and particularly a FPS gamer to quickly and easily feel his/her fingers back to these command and action keys. As described herein, this goal can be achieved by allowing an FPS gamer to distinguish the keys tactilely without having to look away from the gaming system display. These keys and/or others, for example, can be made of a different material than other keys so that they are tactilely different. The differences, for example, can be differences in size, material and/or contour from the other keys on the keyboard 100 to create tactile differences such as raised ridges, bumps, rubberized paint surfaces, metal material, or other tactile differences to distinguish these keys from standard plastic surfaces that may have been used for other keys.

Figure 4A:
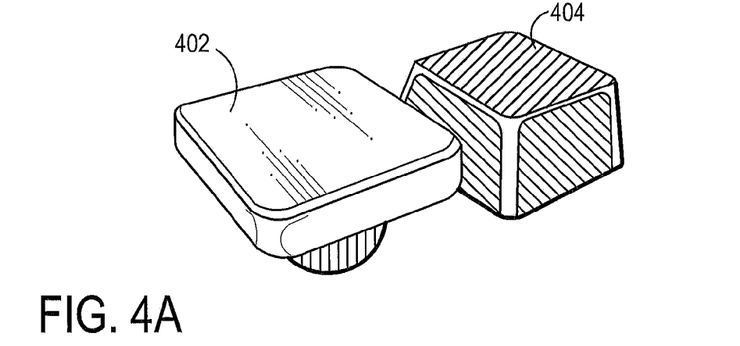
FIG. 4A is a diagram for two keys that are tactilely different.

FIG. 4A provides a diagram for two keys that are tactilely different. As depicted, key 402 has a top surface that is slightly larger than key 404. Key 402 can be configured to have a ridge on its edge, while key 404 can be configured not to have this ridge. In addition, key 402 is preferably made from a different material than key 404. For example, key 402 may be made from a metal material or a metal feeling material, and key 404 may be made from a plastic material. One implementation can be to have the WASD keys 118, the inverted-T arrow keys 106, and/or the spacebar key 116 be made of one material, and the keys that surround these keys be made from a different material. For example, the WASD keys 118, the arrow keys 106 and the spacebar key 116 can be made of metal or a plastic material incorporating a "cold" touch feeling while the surrounding keys can be made from a traditional plastic material. In addition, these cold touch keys could be made such that they do not have rim lighting, while other keys on the keyboard 100 could include rim lighting, if desired. This implementation would help enhance the blind registration of the index, middle and ring fingers of the left hand that are typically used by gamers to control the WASD keys and the blind registration of the left thumb that is typically used by gamers to control the spacebar.

Figure 4B:
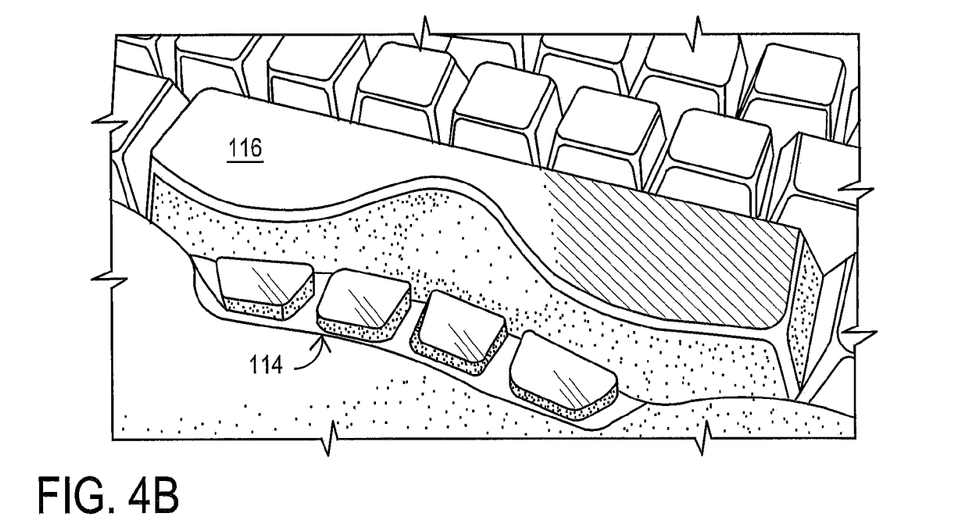
FIG. 4B is a diagram for a spacebar with a thumb notch and function keys located below the spacebar.

FIG. 4B provides a diagram for a spacebar 116 with an ambidextrous thumb notch and function keys 114 located below the spacebar. As depicted, spacebar 116 has a curved notch in its bottom edge towards the middle of the key. This curved notch provides a cradle for either left or right thumb, depending on the user's preference of hand position and comfort. And it provides a tactile registration mechanism allowing the gamer to orient his hand on the keyboard without having to look down at the keyboard. In addition, function keys 114 (four in the embodiment depicted) may be placed below the spacebar 116 and be configured such that the tops of the function keys 114 are lower then the top of the spacebar 116. This height difference allows the thumb to find and nestle into the cradle with relative ease.

Figure 4C:
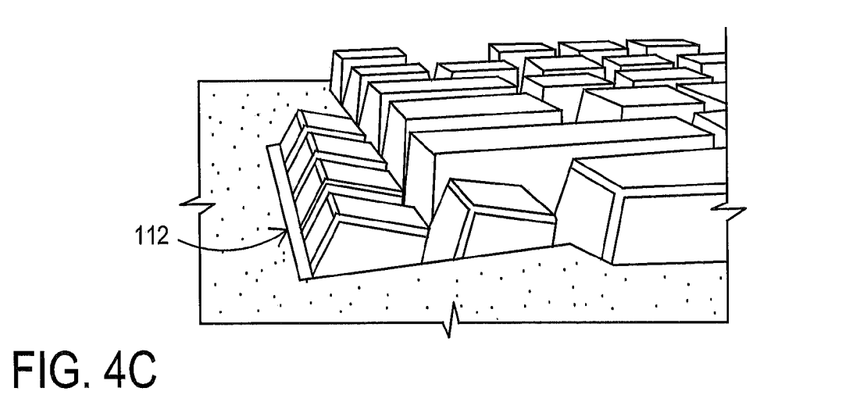
FIG. 4C is a diagram for slanted function keys located adjacent the left side of the alphanumeric key section of the keyboard.

FIG. 4C provides a diagram for slanted function keys 112 located adjacent the left side of the alphanumeric key section 102 of the keyboard. By slanting the top surface of the function keys 112 with respect plane of the keyboard 100 such that the surface of these function keys 112 is directed toward the middle of the keyboard, the left pinky finger can more easily locate and use these function keys. Traditionally, a keyboard's function keys are located at the top of the keyboard 100. As such, a user must move his hand out of gaming position to reach and activate those keys, then re-register his hand back into gaming position often during a game. By placing function keys near a user's left pinky and left thumb below the spacebar 116, the user can easily reach these keys with his/her left pinky and left thumb without moving his/her left hand out of gaming position. Again, for many games, the left hand is often registered on the WASD and spacebar keys. It is noted that these slanted function keys are located on the left edge of the keys in line with or below a line extending through the WASD keys.

While each individual feature discussed above with respect to FIGS. 4A-C are advantageous, one or more combinations of the features presented in FIGS. 4A-C provide for an improved blind registration of the left hand on the gaming keyboard 100. For example, a metal material used for the WASD and spacebar keys coupled with the thumb notch within the spacebar together provide an advantageous implementation for helping a gamer register his/her left hand on the gaming keyboard 100 without having to look at the keyboard 100 and/or look away from the display for the gaming system.

Panic Sensor Mechanism and Response for Hand Re-Registration

As discussed above, the keyboard 100 addresses various gaming features to enhance the gaming experience for gamers playing a variety of games. Although a gamer will typically desire not to take his/her hands off the proper location on the keyboard, there are times that this will occur. The gamer then desires to re-register his/her hands as quickly as possible on the correct keys. To facilitate this re-registration, the keyboard can be configured such that a predetermined set of keys will change states upon the occurrence of a trigger event so as to be distinguishable from other keys on the keyboard 100.

Figure 5A:
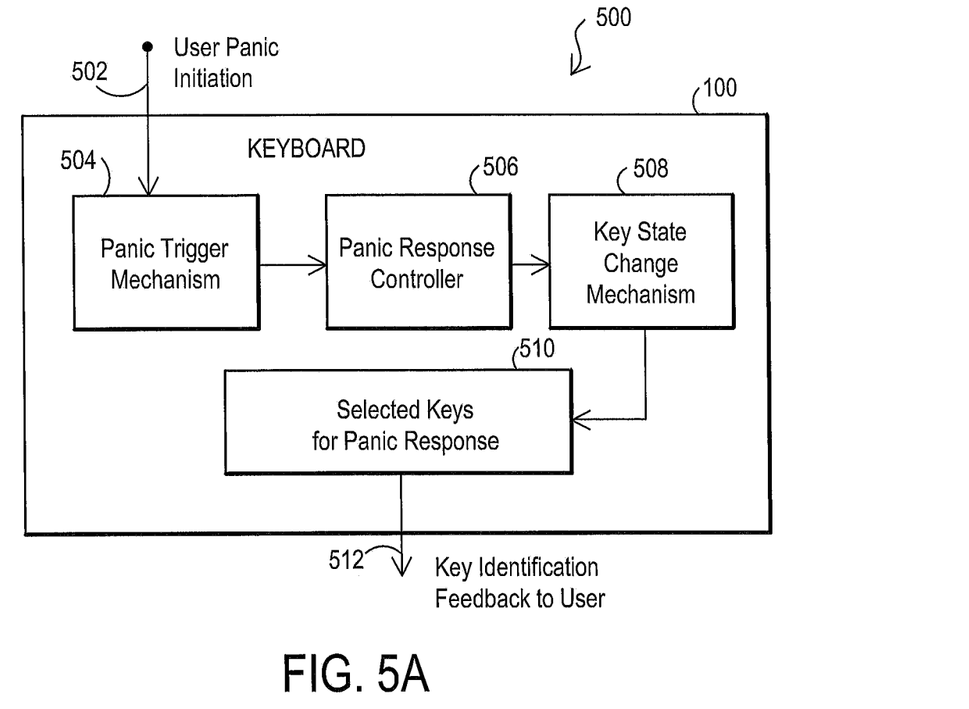
FIG. 5A is a block diagram for a keyboard having a panic mechanism that can be triggered by a user to cause a state change in one or more keys.

FIG. 5A is a block diagram for a keyboard 100 having a panic mechanism that can be triggered by a user to cause a state change in one or more keys. As depicted for embodiment 500, panic trigger mechanism 504 receives user input initiation 502, which can be one or more actions by the user. Upon receiving the initiating action from the user, the panic trigger mechanism 504 communicates this trigger event occurrence to the panic response controller 506. The panic response controller 506 then sends a signal to key state change mechanism 508, which in turn causes one or more key state changes by communicating with selected keys for panic response 510. The selected keys change state in some predetermined way to provide key identification feedback to the user as represented by element 512.

Figure 5B:
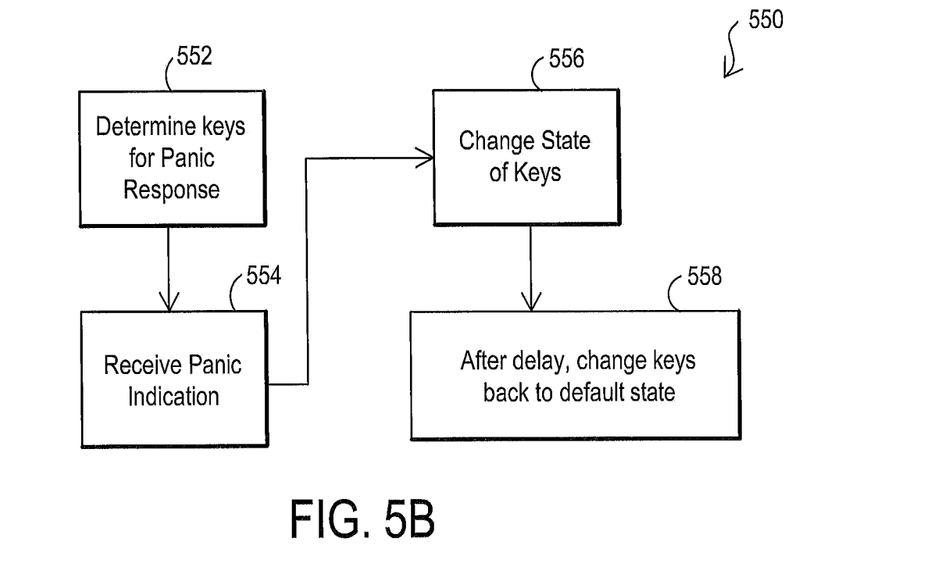
FIG. 5B is a flow diagram for key state change in response to the triggering of a panic mechanism.

FIG. 5B is a flow diagram for key state change in response to the triggering of a panic mechanism. As depicted, the embodiment 550 begins with step 552 where the keys for panic response are determined. Flow then passes to receive block 554 where a panic indication is received from the user. In block 556, the keys then change state. Finally, in block 558, the keys will change back to their default state after some predetermined delay.

The panic trigger mechanism 504 enables a user to cause a state change in selected keys via one or more sensors related to the keyboard 100. The sensor can be mechanically activated, can be voice activated, or can be activated in other ways as desired. For example, the sensor can be located in a palm rest for the keyboard 100 and can be activated by a user bumping or depressing the palm rest. When the sensor is activated, a panic response is triggered such that the predetermined set of keys changes state. If desired, the keys can then return back to their original state after a period of time. Alternatively, a second trigger event could be used to cause the keys to transition back to their original state, and/or more than two states could be used in sequence, as desired. In addition, the user can be allowed to preprogram the system regarding the keys that will selectably change state and/or the desired period of time for the keys to remain in a changed state. For example, the techniques described can be used to cause the WASD and spacebar keys to change state in response to sensor activation thereby allowing an FPS gamer to quickly and easily re-register his/her hands.

As stated above, the state change can be any desired mechanism. For example, the state change can be visual or tactile or both, as desired. The keys can change temperature, color, illumination, and/or vibrate. A metal key, for example, can be configured to change temperature by attaching a carbon dioxide ($CO_2$) cartridge underneath the keyboard that is activated by the panic trigger mechanism on the keyboard 100. When a user activates the sensor, for example, such as by bumping the palm rest 105 with a palm, hand or wrist, a blast of $CO_2$ blows on a back side of one or more metal keys, causing the key to feel cold. A user could quickly identify the predetermined gaming command keys, such as the WASD and spacebar keys, by this change in temperature thereby allowing the proper fingers to be placed back into position without a user having to look at the keyboard 100. The command and action keys can also be configured to vibrate in response to a user activating a palm rest sensor or some other panic trigger mechanism. For this vibration implementation, a piezo-electric device, motor, or some other similar mechanism could be used to cause key vibration. Other mechanism and implementations could be utilized, as desired, to cause the change of state in response to a user-initiated trigger as described herein.

Peripheral Cord Wrap Tray

As discussed above, the keyboard 100 addresses various gaming features to enhance the gaming experience for gamers playing a variety of games. One problem experienced by gamers who like to use wired peripherals is clutter, distraction and potential interference caused by peripheral cords.

Figure 6A:
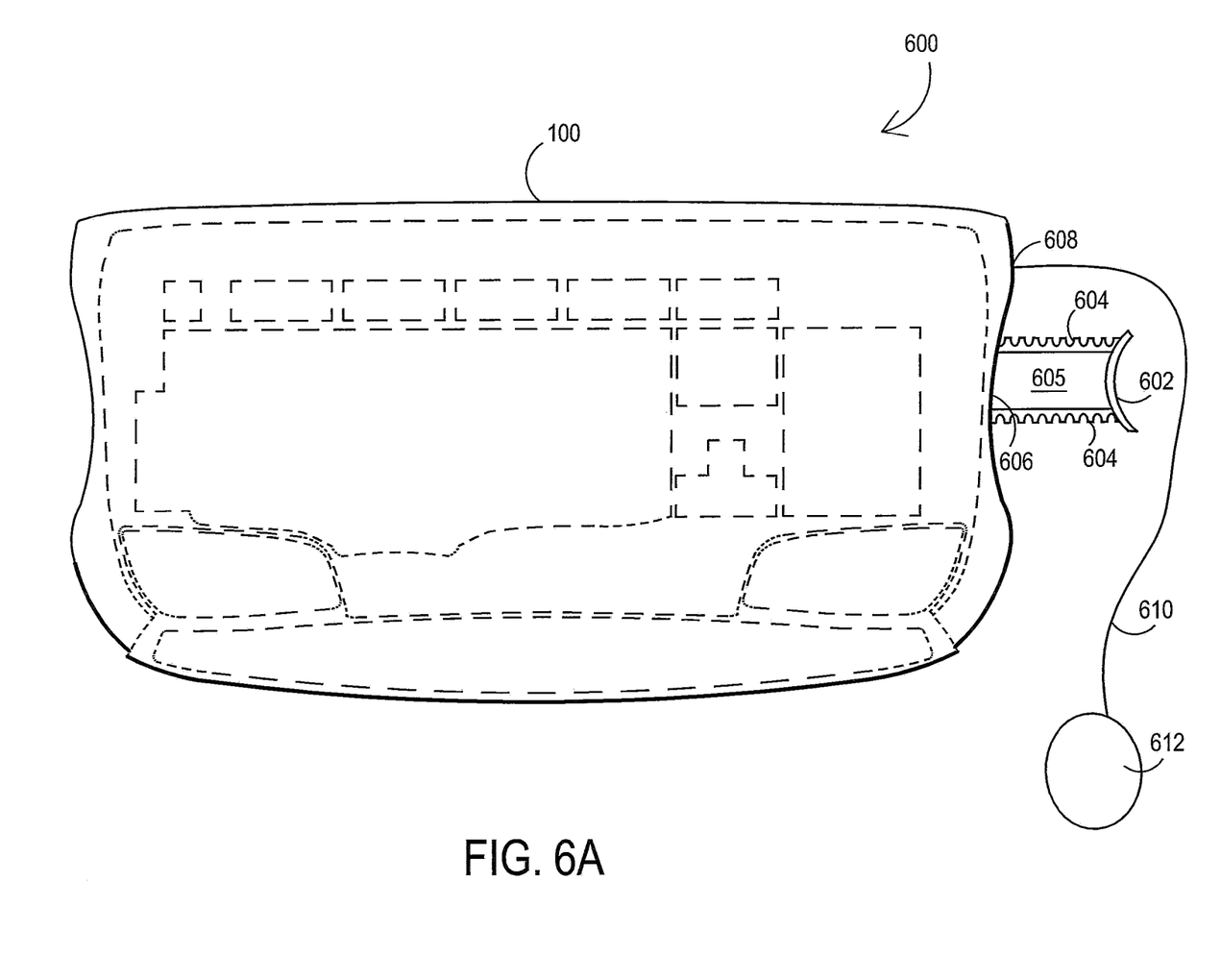
FIG. 6A is a diagram of a keyboard having a mouse cord storage tray in an open position.

FIG. 6A is a diagram of an embodiment 600 including a keyboard 100 having a peripheral cord storage tray 602 in an open position. As depicted, a peripheral device in the form of a mouse 612 is associated with the keyboard 100, and the mouse 612 includes a cable or cord 610 that is attached to the keyboard 100 at port 608. This port 608 can be, for example, a USB connection and preferably a high speed USB 2.0 connection. The cord storage tray 602 has an arm 604 on either side of an end piece to form a U-shape member. This U-shaped member is slidably coupled to the keyboard 100. The keyboard 100 has a recess 606 into which the U-shaped cord storage tray 602 moves when closed. It is noted that the end of the tray 602 within the keyboard 100 may also be implemented so that a cross-member attaches to both arms 604. It is also noted that the interior 605 of the cord storage tray 602 can be open to reduce the weight of the tray and to provide space into which the cord 610 can move when the tray 602 is shut.

The arms 604 also may have cord-like indentions on their outer edges to facilitate wrapping of peripheral cords. The mouse cord 610, for example, can be wrapped around the arms 604 of the cord tray 602. Once wrapped, the cord tray 602 can be closed so that only a small portion of the mouse cord 610 is left outside of the recess 606. It is noted that gamers often have the mouse 612 close to the keyboard 100. It is also noted that many gamers prefer a wired mouse to a wireless mouse due to small timing delays that can occur with wireless devices. The cord tray 602 helps to reduce the bulkiness of the mouse cord 610, which can often became tangled during gaming. Such tangling can cause significant gaming experience problems if it interferes with the motion of the mouse 612 during game play. Although a mouse 612 is one likely peripheral for which the cord tray 602 can be used, the cord tray 602 could also be used for cords of other peripheral, if desired. In addition, multiple cord trays 602 could also be provided with respect to keyboard 100, if desired.

Figure 6B:
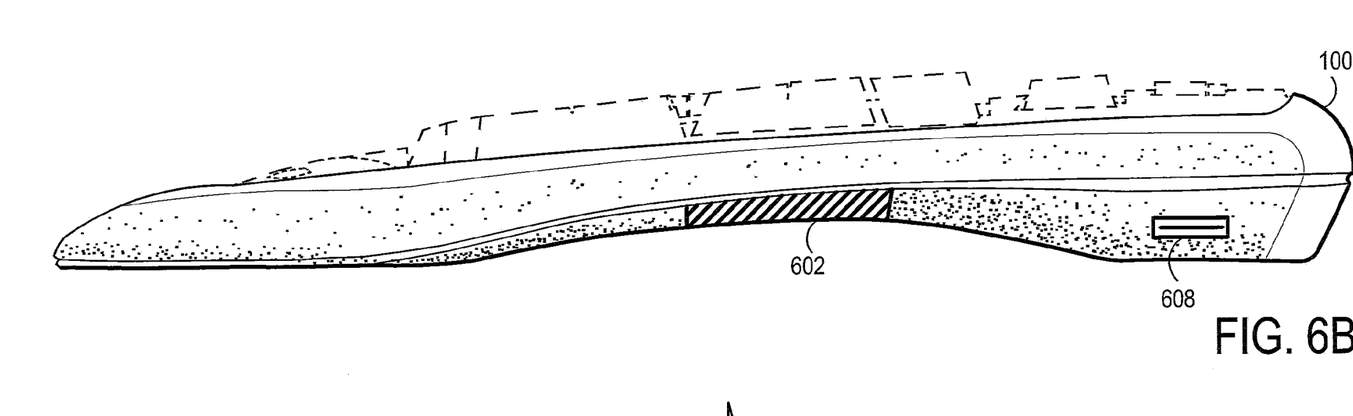
FIG. 6B is a side view of a keyboard having a mouse cord storage tray in a closed position.

FIG. 6B is a side view of a keyboard 100 having a peripheral cord storage tray 602 in a closed position. As depicted, the cord storage tray 602 is fully moved into the recess 606 in the keyboard 100 so that the edge of the peripheral cord tray 602 is flush with the edge of the keyboard 100. Also depicted is a USB type connector 608 into which the peripheral device, such as a mouse 612, can be connected.

Figure 6C:
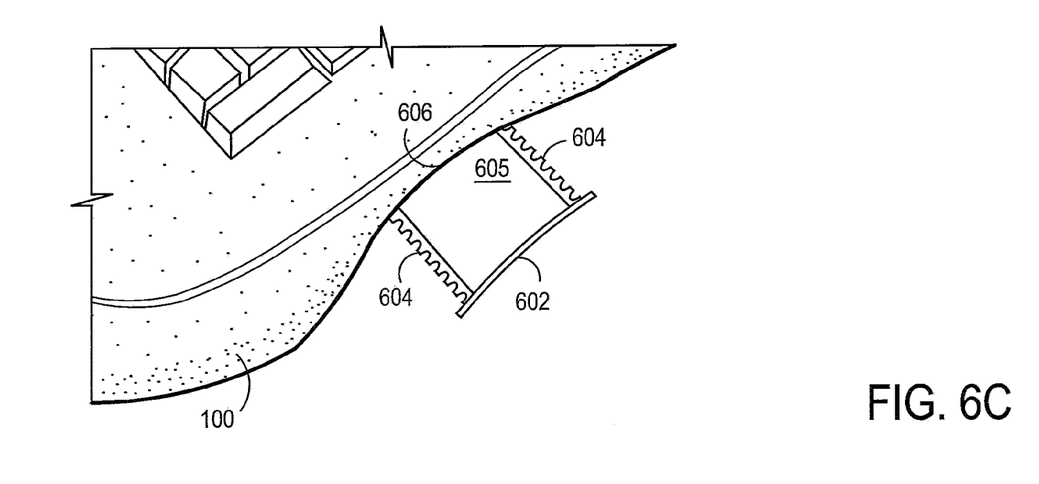
FIG. 6C is a close-up view of a peripheral cord storage tray for a keyboard.

FIG. 6C is a close-up view of a peripheral cord storage tray 602 for a keyboard 100. As depicted, the cord storage tray 602 is in its open position. The arms 604 extend towards the keyboard 100, and the cord storage tray 602 moves into recess 606 when in its closed position. As better seen in this view, it is noted that the ridges in the arms 604 are preferably formed such that they have U-shaped cord-like indentions for receiving the cord. As such, the cord will tend to stay in place once wrapped. It is noted that the indentions along the arms 604 can be sized according to the size of peripheral cords expected to be wrapped, such as mouse cords. It is further noted that the cord tray 602 may also be a magnetic-based closure, if desired.

Further modifications and alternative embodiments of the techniques described herein will be apparent to those skilled in the art in view of this description. It will be recognized, therefore, that the techniques described are not limited by these example arrangements. Accordingly, this description is to be construed as illustrative only and is for the purpose of teaching those skilled in the art the manner of carrying out the techniques described. It is to be understood that the forms of the techniques described herein shown and described are to be taken as the presently preferred embodiments. Various changes may be made in the implementations and architectures. For example, equivalent elements may be substituted for those illustrated and described herein, and certain features of the techniques described may be utilized independently of the use of other features, all as would be apparent to one skilled in the art after having the benefit of this description of the techniques described.

What is claimed is:

1. A keyboard system having a power connection system, comprising:
   a keyboard having a plurality of keys and configured to communicate with an information handling system, the keyboard being separate from the information handling system;
   a connection pod having a power connection input configured to be coupled to an AC/DC adapter as a first power source for the keyboard;
   a first cable coupled between the keyboard and the connection pod, the first cable being configured to carry power and data signals between the connection pod and the keyboard; and
   a second cable coupled to the connection pod and configured to be coupled to the information handling system, the second cable being configured to carry data signals between the information handling system and the connection pod and to carry power from the information handling system to the connection pod as a second power source for the keyboard;
   wherein the keyboard is further configured to operate in different power modes depending upon whether power from the first power source is available through the power connection input for the connection pod.

2. The keyboard system of claim 1, further comprising a key lighting system within the keyboard, the key lighting system being configured to be powered through the connection pod.

3. The keyboard system of claim 2, wherein the key lighting system comprises a plurality of LEDs.

4. The keyboard system of claim 3, wherein the key lighting system comprises twelve or more RGB (red, green, blue) LEDs.

5. The keyboard system of claim 3, wherein the keyboard includes a plurality of LED drivers for the plurality of LEDs, and wherein the keyboard is configured to use a reduced number of LED drivers when the first power source is not available.

6. The keyboard system of claim 1, wherein the connection pod further comprises an audio input connection and an audio output connection.

7. The keyboard system of claim 6, wherein the connection pod is configured to receive audio signals from the information handling system and to send audio signals to the information handling system.

8. The keyboard system of claim 1, wherein the keyboard further comprises two or more USB ports.

9. The keyboard system of claim 8, wherein the second cable comprises a USB connection.

10. The keyboard system of claim 9, wherein the keyboard includes a USB controller for the two or more USB ports, and wherein the keyboard is configured to use the USB controller only when the first power source is available.

11. A method to operate a keyboard, comprising:
   communicating between a keyboard having a plurality of keys and an information handling system, the keyboard being separate from the information handling system;
   providing power and data signals to the keyboard through a first cable coupled between the keyboard and a connection pod, the connection pod having a power connection input configured to be coupled to an AC/DC adapter as a first power source for the keyboard;
   using a second cable coupled between the connection pod and the information handling system to communicate data signals between the information handling system and the connection pod and to carry power from the information handling system to the connection pod as a second power source for the keyboard; and
   operating the keyboard in different power modes depending upon whether power from the first power source is available through the power connection input for the connection pod.

12. The method of claim 11, further comprising powering a key lighting system for the keyboard through the connection pod.

13. The method of claim 12, wherein the key lighting system comprises a plurality of LEDs.

14. The method of claim 13, wherein the key lighting system comprises twelve or more RGB (red, green, blue) LEDs.

15. The method of claim 13, wherein the keyboard includes a plurality of LED drivers for the plurality of LEDs, and further comprising using a reduced number of LED drivers when the first power source is not available.

16. The method of claim 11, further comprising communicating audio input signals and audio output signals through the connection pod.

17. The method of claim 16, further comprising receiving audio signals from the information handling system and sending audio signals to the information handling system.

18. The method of claim 11, wherein the keyboard further comprises two or more USB ports.

19. The method of claim 18, wherein the second cable comprises a USB connection.

20. The method of claim 19, wherein the keyboard includes a USB controller for the two or more USB ports, and further comprising using the USB controller only when the first power source is available.

* * * * *